May 11, 1937.   E. C. HORTON   2,079,858
FUEL FEEDING SYSTEM FOR MOTOR VEHICLES
Filed Feb. 2, 1933
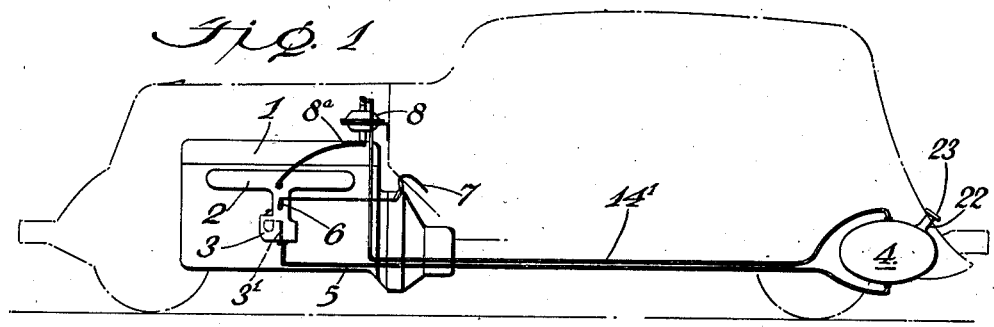
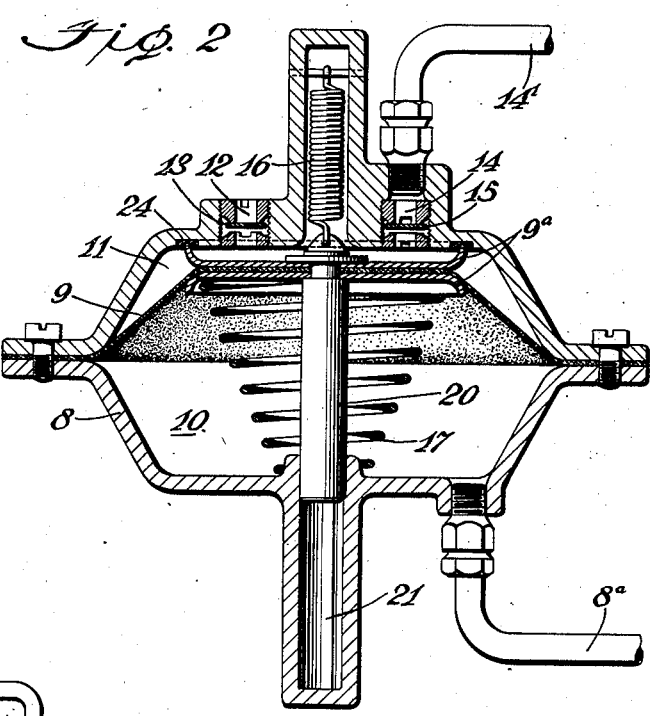
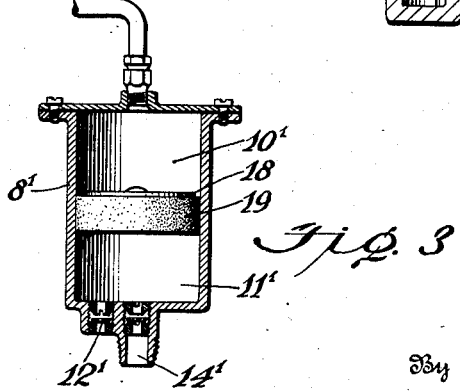
Inventor
Erwin C. Horton
By Bean & Brooks, Attorneys Patented May 11, 1937

2,079,858

UNITED STATES PATENT OFFICE 2,079,858

FUEL FEEDING SYSTEM FOR MOTOR VEHICLES

Erwin C. Horton, Hamburg, N. Y., assignor to Trico Products Corporation, Buffalo, N. Y.

Application February 2, 1933, Serial No. 654,948

9 Claims. (Cl. 158—36.4)

This invention relates to a fuel feeding system for motor vehicles and has for its primary object to simplify the present system and improve the method and manner of operating the same to feed fuel from the supply tank, which is usually located at the rear of the motor vehicle, to the carburetor.

Pumps of various types have been devised to feed the fuel from the supply tank, such as electrically operated, fluid operated, and mechanically operated pumps. When electrically operated, such pumps subject the vehicle storage battery to an additional burden; when operated by fluid pressure intricate and delicate valving mechanism is necessitated to insure the operative applications of fluid pressure from two sources for the operation of the pump; and when mechanically operated there is likelihood of subjecting the system to excessive pressures and strains resulting in injury and impairment thereto.

It has also been proposed to vibrate a diaphragm by the periodic pressure variations incidental to the explosions in the combustion chamber of an internal combustion engine but in such constructions the diaphragm has been of necessity of great strength to withstand the high pressures to which it is subjected through its connection with the combustion chamber, and therefore, due to the stout and rather rigid construction of the diaphragm, it is impossible to obtain pumping vibrations without engine explosions; consequently such pumps are impractical because of their inability to supply a dry carburetor with the required fuel. Further such pumps have the disadvantage of not only becoming fouled by the products of combustion but are objectionable in that due to the excessive pressures under which they operate there is great likelihood of injury and breakage in the system with a consequential fire hazard.

A further object of the present invention is to provide a fuel feeding system in which the fluid pressure impulses that are supplied to the pump of the system have their formation and periodicity under the control of the operator or driver by and during the manipulation of the vehicle internal combustion engine. The invention further has for its object to reciprocate the fluid displacing means of the pump of a fuel feeding system back and forth in substantial correspondence with and by the rise and fall of the mean effective pressure in the intake manifold, utilizing such mean pressure through an ebb and flow connection with the pump for causing substantially like rise and fall pressure conditions in the pump for the actuation thereof.

The present invention has for another object to provide a fuel feeding system in which a pump of simple construction is provided having a minimum number of working parts; and, further, the invention has for its object to incorporate the pump in the fuel system of the vehicle and to relate it to a source of variable pressure influence, variable with the normal operation of the vehicle, so that the pressure variations may act to operate the pump.

In the drawing:

Fig. 1 is a diagrammatic view illustrating the invention in one embodiment applied to a motor vehicle.

Fig. 2 is an enlarged sectional view through the pump.

Fig. 3 is a sectional view of a slight modification in the pump.

Referring more particularly to the drawing, the numeral 1 designates an internal combustion engine of a motor vehicle, 2 the intake manifold thereof, 3 the carburetor and 4 the fuel supply tank which latter is disposed at a lower level with respect to the carburetor 3 and connected thereto as by a conduit 5. This conduit is adapted to be closed by the float valve 3' of the carburetor to maintain a definite fuel level in the latter, the valve preferably opening toward the carburetor or away from the supply tank when fuel replenishment is required. The throttle valve 6 is designed to be opened and closed in the usual manner, such connection being herein illustrated as being made with the accelerator pedal 7 so that as the pedal is depressed the throttle will open and as the pedal is released the throttle will close.

It is well known that with the engine running and the throttle in its closed or idling position the manifold suction influence is high, and as the throttle is opened such manifold suction influence will decrease. This general rise and fall in the manifold pressure influence occurs at frequent intervals and is incidental to the driving of the vehicle and such general pressure variations are utilized solely for the direct fluid pressure applications to the pump now to be described.

Referring particularly to Fig. 2 the pump herein depicted comprises a casing 8 having a diaphragm piston 9 dividing the interior thereof into a motor chamber 10 and a pump chamber 11.

The motor chamber has free and uninterrupted communication with the intake manifold through a connecting passage 8a. The motor chamber is otherwise substantially sealed against communication with any other source of pressure influence. Consequently, the rise and fall of the manifold pressure influence will ebb and flow through the passage 8a and in the motor chamber and thereby effect a corresponding fall and rise of the piston 9.

The pump chamber is provided with an air inlet 12 having an inwardly opening check valve 13, and an outlet port 14 controlled by an outwardly opening valve 15, so that as the piston 9 moves downwardly within the casing 8 air will be drawn inwardly past the valve 13 and then on the following upward movement of the piston such intaken fluid will be expelled through the outlet 14 into the fuel supply tank 4 to which it is connected by conduit 14'. The piston is urged on its air expelling stroke by efficient means, such as a tension spring 16 or a compression spring 17, or both, or the diaphragm may be weighted as at 18 in Fig. 3 wherein the diaphragm has been replaced by a sliding type of piston 19. Thus, the rising and falling pressure cooperates with the spring to reciprocate the piston. A guide stem 20 may be connected to the central portion of the diaphragm 9 so as to guide the pumping movement thereof, the free end of the stem being loosely guided in a well 21 of the casing 8. The central diaphragm portion may be reinforced by body plates 9a.

The piston may be properly termed as being self-returning, i. e., the spring or weight means returns the piston to a normal position in the absence of a sufficient counteracting force which in this instance is the pressure differential acting on the piston when the suction influence is high in the motor chamber, the pressure in the pump chamber being substantially atmospheric. The motor chamber communication with the manifold chamber through the conduit 8a is short for the more ready equalization of pressures and a quicker ebb and flow of the fluid from one chamber to the other. This will insure a prompt response of the self return piston when the suction influence is high or of a predetermined degree.

In the operation of the fuel feeding system, let it be assumed first that a supply of gas is poured into the dry tank 4 through the filling opening 22 and the latter then sealed, as by tightly screwing down the cap 23 which cap is without any vent or at least seals the tank against any unauthorized leakage. The engine is then momentarily turned over by the self-starter system to produce a low pressure in the manifold 2 and since this has a direct and unrestricted communication with the chamber 10 of the casing 8 a substantially corresponding low pressure will occur in said motor chamber to effect a downward pull on the piston 9 against the tension of its spring means 16 (17). The driver then stops his engine so as to allow the manifold pressure to rise and permit the spring or other energy expending means to move the diaphragm piston upwardly for expelling the air through the outlet 14 into the supply tank 4. One or two such operations will suffice to provide sufficient pressure in the tank to cause a flow of fuel to the carburetor 3, depending upon the fluid displacement of the pump. Fuel having once been supplied to the carburetor the engine may be started in the usual manner. Thereafter, every time the throttle is opened, as by depressing the accelerator, the drop in the manifold pressure will permit the pump to force air into the supply tank 4 and thereby keep the fuel under pressure sufficient to insure proper feeding of the gasoline. This pressure will continue to build up in the tank 4 until a predetermined pressure is reached which may be controlled by suitable means such as in the present case by the tension of the springs 16 and 17 (or the weight 18), since obviously the diaphragm piston will fail to operate when the tank pressure equals or counteracts the tension or resistance offered by the springs or weight. So that as the automobile is operated in the usual manner the air pump is operating by the rise and fall in the manifold pressure influence incidental to the usual operation of a motor vehicle.

Normally, the piston is in its uppermost position and therein may rest on a silencing pad or ring 24.

Referring to the modification of Fig. 3, the pump casing 8' is provided with an inlet port 12' and an outlet port 14', the pump chamber 11' being separated from the motor chamber 10' by the piston 19.

In either form of the invention it is to be observed that there is no intricate valve mechanism required to alternately subject the piston to atmospheric and subatmospheric pressures, but that the motor chamber is directly connected to a sole source of operating pressure through the suction conduit 8a, this communication being free and unobstructed so as to insure a ready equalization of pressures in the chamber 10 and manifold 2 as the pressure variations in the latter occur. Therefore, the movement of the pump piston will quickly respond to the pressure variations in the manifold and such responsive action of the pump will insure placing the fuel under the desired urge for moving it to the carburetor.

The pump connection with the intake manifold is preferably with that portion of the latter in which the mean effective pressure is most pronounced for creating the ebb and flow fluid movement through the conduit 8a. The piston 9, being cupped and readily flexible, is free to respond to the pressure changes which are obviously restricted by reason of the fact that the intake manifold pressure is less than atmospheric.

When the accelerator is depressed or tramped to open the throttle, more gas or mixture is obviously required to meet the increased demand of the engine. Automatic with this tramping of the accelerator the piston 9 is released for spring actuation to place the fuel in the supply tank under greater pressure and thereby increase its urge to move on to the carburetor for meeting such increased demand.

The system is exceedingly simple in its construction and utilizes a minimum number of parts, namely a piston under an urge in one direction, and a chamber therefor, the piston having free unvalved communication with the manifold through a passage of sufficient size to insure ready equalization of the pressure in chamber 10 with that of the manifold as the manifold pressure fluctuations take place. The connecting passage between the pump chamber 10 and the manifold therefore has a two-way flow, an ebb and flow movement of air column, that is, as the pressure in the manifold drops below that in chamber 10 the connecting air column will move from the latter to the manifold, and then upon reversal of pressure conditions, as when the manifold pressure rises above that in the motor chamber the connecting air column will reverse its flow and move from the manifold to the chamber 10, so that in effect the connecting air column in the passage 8a will more or less surge back and forth, ebb and flow, according to the relative pressure differences in the chamber 10 and manifold 2. Preferably the diaphragm is non-resilient so that the high suction will act in cooperation with the spring means to constitute the sole operating means for the piston, there being no additional source of fluid pressure relied upon for the actuation of the pump.

What is claimed is:

1. The combination with a motor vehicle power plant of the internal combustion type having an intake manifold, throttle means therefor, fuel feeding means including a pump casing having a chamber, a piston in the chamber dividing the latter into a pump chamber and a motor chamber, means for urging movement of the piston to ensmall the pump chamber, a constantly open passage connecting the motor chamber to the intake manifold at the engine side of said throttle means, said passage constituting the sole passage by which fluid may enter or leave the motor chamber and being unobstructed for the ebb and flow of fluid between the motor chamber and the manifold to effect equalization of the pressure in the motor chamber with that of the intake manifold as the pressure influence of the latter varies with the operation of said throttle means, said means for urging movement of the piston being counteractable by a predetermined low pressure in the motor chamber, as when the throttle means is closed, sufficient to move the piston to enlarge the pump chamber.

2. The combination with a motor vehicle power plant of the internal combustion type, having a source of pressure which pressure is substantially steady at a given operating condition of the power plant and is variable with a change in the operating condition whereby the pressure has a general rise and fall, fuel feeding means including a reciprocable pumping member, resilient means opposing movement of the member, and means for constantly subjecting one face of said member to, and only to, the pressure influence of said source, whereby said member is reciprocated upon and by virtue of rise and fall of the pressure influence of said source.

3. A motor vehicle power plant of the internal combustion engine type having a carburetor, an intake manifold, throttle means for the manifold, fuel feeding means including a chamber and a pump piston movable in one direction by high suction influences effected in the chamber by the intake manifold, means yieldably urging the pump piston in the opposite direction and acting to move the piston in such opposite direction (in the absence of such high suction influences) for effecting such flow of fuel to the carburetor, and an ebb and flow passage providing substantially constant and unobstructed communication between said chamber and the intake manifold whereby the varying pressure influences in the manifold will ebb and flow through said passage and likewise substantially occur in said chamber for causing reciprocation of the piston.

4. A motor vehicle power plant of the internal combustion type having a source of fluctuating pressure, a fuel supply tank closed to the outside atmosphere, and means having substantial air displacing capacity for supplying air pressure to said tank for feeding fuel therefrom, said means including a fluid pressure motor chamber with a sole port, an ebb and flow pressure equalizing passage from said port to said source whereby the pressure fluctuations of the latter will be substantially followed in the motor chamber, said equalizing passage being of a size to permit ebb and flow movement of the air column substantially concurrent with reverse changes in pressure at said source, means acting in alternation with pressure fluctuations of a predetermined value in the motor chamber and cooperating therewith for operating the pump and throttle means for the power plant operable to effect such fluctuations in the pressure influences.

5. A suction operated fuel pump operable by the rise and fall in the suction influence at the induction side of the engine, comprising a self return piston operable to enlarge and ensmall a motor chamber and normally positioned to enlarge such chamber, and a constantly opened ebb and flow fluid port for the chamber for connection to the induction side of the engine, the chamber being otherwise closed to other pressure and to the atmosphere.

6. In combination with an internal combustion engine having an intake manifold and throttle means for the manifold, a fuel feeding means comprising a chamber having a wall member reciprocable therein by and upon variation of pressure within the chamber, and a constantly open passage connecting the chamber and manifold, said passage constituting the sole substantial means for conducting fluid to or from said chamber, whereby variation of the suction induced in said passage by the manifold, as upon opening and closing movement of the throttle means, will effect variation of the fluid pressure within said chamber to cause reciprocation of the wall member.

7. In combination with an internal combustion engine having an induction side wherein suction influences fall and rise with opening and closing of the engine throttle, and a fuel tank, means for pumping air into the tank, including a motor chamber and a pumping piston constituting one face of the chamber, a single fluid passage into said chamber in constantly open communication with the induction side of the engine whereby one face of the piston is subjected only to the suction influence of said induction side and the piston is movable in one direction by high suction influences, and means for moving the piston in the opposite direction in the presence of low suction influence.

8. A pumping device associated with the manifold of an internal combustion engine comprising a hollow casing interiorly divided by a flexible diaphragm to form a pump chamber on one side of the diaphragm and a motor chamber on the other side of the diaphragm, said diaphragm having resiliency associated therewith for normally causing it to be flexed into the pump chamber, and a passage connecting the motor chamber to the intake manifold whereby when the suction influence of the latter is high the diaphragm will be flexed into the motor chamber to expand the pump chamber, said passage constituting the sole effective conduit for fluid movement from or into the motor chamber, and means associated with the engine for varying the suction influence of the manifold.

9. An internal combustion power plant for motor vehicles, having an intake manifold, throttle means therefor, a carburetor, a fuel supply tank closed to the outside atmosphere and connected to the carburetor, a pump chamber having a valved air inlet and a valved air outlet, the outlet connected to the supply tank for subjecting the fuel content thereof to air pressure for feeding fuel to the carburetor, a motor chamber separated from the pump chamber by a piston wall which is movable in one direction to intake air into the pump chamber and in the opposite direction to expel air to the supply tank, means for normally urging the piston wall in such opposite direction to so expel air, the motor chamber being closed to the outside atmosphere, and a constantly opened ebb and flow connection between the motor chamber and the manifold at the engine side of the throttle means, whereby changes in position of the throttle means will effect changes in pressure influence transmittable to the motor chamber through the ebb and flow connection for simultaneously controlling the movement of the piston wall in one direction as well as in the opposite direction.

ERWIN C. HORTON.